United States Patent
McClure

(10) Patent No.: US 10,982,701 B2
(45) Date of Patent: Apr. 20, 2021

(54) SINGLE SIDE TEMPORARY FASTENER WITH CONSTANT PRESSURE FEATURE

(71) Applicant: Centrix Inc., Kent, WA (US)

(72) Inventor: Travis McClure, Kent, WA (US)

(73) Assignee: Centrix Inc., Kent, WA (US)

( * ) Notice: Subject to any disclaimer, the term of this patent is extended or adjusted under 35 U.S.C. 154(b) by 82 days.

(21) Appl. No.: 15/493,090

(22) Filed: Apr. 20, 2017

(65) Prior Publication Data

US 2017/0307002 A1 Oct. 26, 2017

Related U.S. Application Data

(60) Provisional application No. 62/325,389, filed on Apr. 20, 2016.

(51) Int. Cl.
*F16B 19/10* (2006.01)

(52) U.S. Cl.
CPC .................. *F16B 19/109* (2013.01)

(58) Field of Classification Search
CPC ...... F16B 19/109; F16B 19/008; F16B 19/02; F16B 1/0014
USPC .......................... 269/48.1, 49, 309, 310, 54.1; 81/451–455
See application file for complete search history.

(56) References Cited

U.S. PATENT DOCUMENTS

| | | |
|---|---|---|
| 1,978,935 A | 10/1934 | Douglas |
| 2,256,243 A | 9/1941 | Edwards |
| 2,370,336 A | 2/1945 | Wallace |
| 2,379,786 A | 7/1945 | Bugg et al. |
| 2,649,884 A | 8/1953 | Westover |
| 2,775,155 A | 12/1956 | Tompkins et al. |
| 2,936,015 A | 5/1960 | Rapata |

(Continued)

FOREIGN PATENT DOCUMENTS

| | | | |
|---|---|---|---|
| EP | 0275160 A2 | 7/1988 | |
| GB | 413403 A * | 7/1934 | ........... B25B 31/005 |

(Continued)

OTHER PUBLICATIONS

Foreign Translation (Year: 1934).*

(Continued)

*Primary Examiner* — Tyrone V Hall, Jr.
*Assistant Examiner* — Abbie E Quann
(74) *Attorney, Agent, or Firm* — McCoy Russell LLP

(57) ABSTRACT

A single side temporary fastener (SSTF) capable of maintaining a clamping force in a material stack subject to material creep or adjunct extrusion during clamp up processes is disclosed. The SSTF comprise a rotationally constrained but freely translatable collet body that is disposed within an auxiliary structure such as a fastener housing. A fastener comprises the aforementioned collet body, which at least partially translates within the aforementioned auxiliary structure, and further comprises a threaded screw for rotationally engaging with the collet body, which by way of an anti-rotation means associated therewith and with the auxiliary structure, is rotationally constrained but is free to axially translate. Constant clamping pressures are made possible in such embodiments by the inclusion of at least one biasing element between compression force transmitting elements and/or assemblies of the fasteners.

15 Claims, 11 Drawing Sheets

(56) References Cited

U.S. PATENT DOCUMENTS

| | | | |
|---|---|---|---|
| 2,994,242 A | 8/1961 | Buff et al. | |
| 3,233,504 A * | 2/1966 | Jones | B25B 31/005 |
| | | | 269/48.3 |
| 3,469,493 A | 9/1969 | Fisher | |
| 3,883,129 A * | 5/1975 | Jones | F16B 19/109 |
| | | | 269/49 |
| 4,537,542 A | 8/1985 | Pratt et al. | |
| 5,065,490 A | 11/1991 | Wivagg et al. | |
| 5,095,779 A * | 3/1992 | Batten | B25B 13/488 |
| | | | 81/453 |
| 5,704,752 A | 1/1998 | Logerot | |
| 6,174,118 B1 | 1/2001 | Rebers | |
| 6,287,044 B1 | 9/2001 | Huber | |
| 2002/0144574 A1 | 10/2002 | Avetisian | |
| 2005/0200066 A1 * | 9/2005 | McClure | F16B 19/109 |
| | | | 269/47 |
| 2007/0243037 A1 | 10/2007 | Pratt | |
| 2011/0088242 A1 * | 4/2011 | Luneau | B21J 15/043 |
| | | | 29/525.01 |
| 2011/0232072 A1 | 9/2011 | Prot et al. | |
| 2013/0039716 A1 | 2/2013 | McClure | |
| 2016/0312815 A1 * | 10/2016 | Bigot | F16B 19/109 |

FOREIGN PATENT DOCUMENTS

| | | |
|---|---|---|
| GB | 413403 A | 7/1934 |
| GB | 624714 A | 6/1949 |
| GB | 1548964 A | 7/1979 |
| JP | H1151018 A | 2/1999 |

OTHER PUBLICATIONS

International Bureau of WIPO, International Preliminary Report on Patentability Issued in Application No. PCT/US2017/028697, dated Nov. 1, 2018, 10 pages.

* cited by examiner (A)

(B)

SINGLE SIDE TEMPORARY FASTENER WITH CONSTANT PRESSURE FEATURE

CROSS REFERENCE TO RELATED APPLICATION

This application claims the benefit of U.S. Provisional Patent Application No. 62/325,389 filed Apr. 20, 2016, the contents of which are hereby incorporated by reference.

TECHNICAL FIELD

This description relates generally to temporary fasteners and more specifically to single side temporary fasteners maintaining a clamping force during clamp up processes.

BACKGROUND

Clamping one or more typically planar plates, or work pieces, in place during assembly can be challenging-especially if a soft pliable material such as glue, adhesive, or other resilient material is used between the pieces. If a conventional clamp is used, the glue can ooze out the sides, the clamp loosens and slips. Or, if the clamp is tightened too much so that it does not slip, all the glue may ooze out leaving insufficient material to bond the work pieces. In a home workshop this is not particularly problematic. However, in a production environment, such as the aerospace industry where such operations are common and must be done in a time efficient manner, it may be desirable to have a clamping device that is easy to apply and exerts a steady pressure while it is being used, resulting in consistent work piece attachment and consistent thicknesses of the resilient material that may be present there between.

In clamping work pieces together, once a compressive clamping force has been achieved, it is usually desired to maintain the clamping force over the duration needed for temporary clamping. However, this is not the case generally if the material stack is subject to material creep or adjunct extrusion (i.e., loss of a deformable substance from the area being clamped). In such instances, the loss of material or adjuncts results in a decrease in the stack height and in clamping force between the points of fastener contact.

A common scenario in this regard is created when the material stack includes a sealant, an adhesive, or other fluidic substance that is displaced from the locale being compressively affected by the SSTF. Accordingly, there is a need to a temporary fastener capable of maintaining a clamping force during clamp up processes

SUMMARY OF THE INVENTION

The invention is directed to constructing a constant pressure single side temporary fasteners (SSTFs) having various unique mechanisms for maintaining a constant pressure clamping force, or range of constant pressure clamping forces, in a material stack subject to material creep or adjunct extrusion during clamp up processes that would normally cause reduced clamping pressure over time the clamp is applied. These mechanism for clamping may include the inclusion of biasing members, whether internal, external or combinations thereof, to the basic fastener, and operate to preserve, or at least minimize, a decrease in an established clamping force in the material stack when one or more constant pressure single side temporary fasteners are employed. The constant pressure single side temporary fastener may be constructed in several exemplary configurations.

In some examples, the constant pressure SSTF comprises a rotationally constrained but freely translatable collet body that is disposed within an auxiliary structure such as fastener housing. The fastener encompasses the aforementioned collet body, which at least partially translates within the aforementioned auxiliary structure, and further encompasses a threaded screw for rotationally engaging with the collet body, which by way of anti-rotation devices associated therewith and with the auxiliary structure, is rotationally constrained but is free to axially translate. Constant clamping pressures are made possible in such examples by the inclusion of at least one biasing element between compression force transmitting elements and/or assemblies of the fasteners.

To facilitate translational movement the collet body used in the various examples of constant pressure SSTF may include a plurality of fingers that terminate at one end. Each finger includes a protruding portion incorporating a leading face and trailing face. The collet body further includes an internal wall portion disposed within the fastener housing. The internal wall portion has internal threads complementary to a threaded screw, thereby permitting threadable engagement there between and transferring the rotational movement of the threaded screw into a translational movement of the collet body within the housing body and also translatable threaded screw movement either towards, or away from the collet body fingers.

The collet body also includes a two part anti-rotation mechanism, which is preferably characterized as a complementary non-circular feature(s) (e.g., a planar surface, a slot or groove, a land, a key or protrusion, etc.). The collet body further includes a distal end having radially displaceable fingers, each preferably having a work piece gripping element on an exterior surface thereof and a screw interface on an interior surface thereof. The collet body additionally defines a central, axially aligned bore having an internal threaded portion, preferably at or adjacent to a proximal end.

The exterior dimensions and surface geometry of the collet body are such that preferably all portions thereof, but the anti-rotation mechanism, which may be localized at the proximal end of the collet body, are translatably extendable past the housing distal end. Preferably, the proximally localized collet body anti-rotation mechanism constitutes another part of the translation arresting mechanism, and axially interferes with a portion of the housing, which as previously described constitutes another part of a translations arresting mechanism.

According to various invention examples, the threaded screw includes a screw having a threaded portion, a proximal end and a distal end, and which is threadably engageable with the collet body threaded portion. Additionally, the threaded screw is preferably associated with the housing, e.g., linked or held captive there with, as will be described below with respect to assembled examples of the invention. In this configuration, the screw or structure attached thereto compressively contacts the housing when the screw is placed into tension, such as when the collet body is caused to translate into the housing during fastener clamp up operations.

The various invention examples are characterized in one respect by the previously mentioned constant clamping pressure feature. Basic operation of SSTFs occur when, after partial collet body insertion into a work piece stack having a plurality of aligned holes, the screw rotationally interacts with the collet body, and causes the latter to translatably retract into the housing until the work piece gripping element(s) on the distal end of the collet body compressively contact(s) a distal work piece in the stack. At this juncture, increasing tension-induced force is imparted in the screw, which resists reactive translation towards the collet body through its compressive coupling with the housing. As a consequence, the housing increasingly compressively contacts proximal work piece in the stack as the screw is further rotated until desired clamping has been achieved. These elements are then considered compression force transmitting elements/assemblies in that they are necessary for the establishment of a clamping action on the stack.

According to the various invention examples, the SSTF further comprises an inner sleeve and an outer sleeve capable of rotating with respect to the inner sleeve. The rotation matches the angle of the surface clamped against, forced by the impetus of the clamping pressure during the early stages of fastening parts together. This allows clamping faces to align against complex surfaces or to compensate for holes that are not fabricated perpendicular to work piece surfaces.

According to the various invention examples, the SSTF further comprises a memory ring coupled between the inner sleeve and the outer sleeve. The compression of the ring during clamping of the fastener acts as a dampener. The clamping force applied during tightening is distributed more evenly over a longer period of time thus eliminating shock loading. Once compressed, the ring acts as a spring to provide clamping force should the geometry of the work pieces change. Memory ring can be sized to deform a maximal amount, or it can be designed to fill a void completely when compressed to as to prevent further compression and/or create a seal.

According to the various invention embodiments, the SSTF may incorporates a combination of retention features, free slide zone, cooperating faces and memory ring to create an articulating outer sleeve which can translate (to dampen and create spring affect), rotate (to align), create a seal if desired, and to do so simultaneously.

It should be noted, however, that only two elements are necessary for creating the desired clamping force, and those are the collet body and the housing; in the described example, the screw merely provides a means for retracting the collet body into the housing and ensuring that the collet body gripping elements are optimally positioned relative to the distal work piece.

Based upon the foregoing, by operatively interposing at least one biasing member between any of these compression force transmitting elements/assemblies (or additional elements/assemblies in the compression chain), a resilience feature can be built into the fastener. Thus, some invention embodiments interpose at least one biasing member at a compressive coupling between the screw (which includes linked structure) and the housing, while other invention embodiments interpose at least one biasing member between the housing and adjacent work piece. As noted previously, it is also within the scope of the invention to utilize both mentioned approaches.

For purposes of this patent, the terms "area", "boundary", "part", "portion", "surface", "zone", and their synonyms, equivalents and plural forms, as may be used herein and by way of example, are intended to provide descriptive references or landmarks with respect to the article and/or process being described. These and similar or equivalent terms are not intended, nor should be inferred, to delimit or define per se elements of the referenced article and/or process, unless specifically stated as such or facially clear from the several drawings and/or the context in which the term(s) is/are used.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe single side temporary fasteners (SSTFs) used to hold, at least temporarily, at least two work pieces together where a portion of a SSTF is disposed in substantially aligned holes or bores formed in the work pieces. Although the present examples are described and illustrated herein as being implemented in various embodiments, the description is provided as an example and not a limitation. As those skilled in the art will appreciate, the present examples are suitable for application in a variety of different types.

Figure 1:
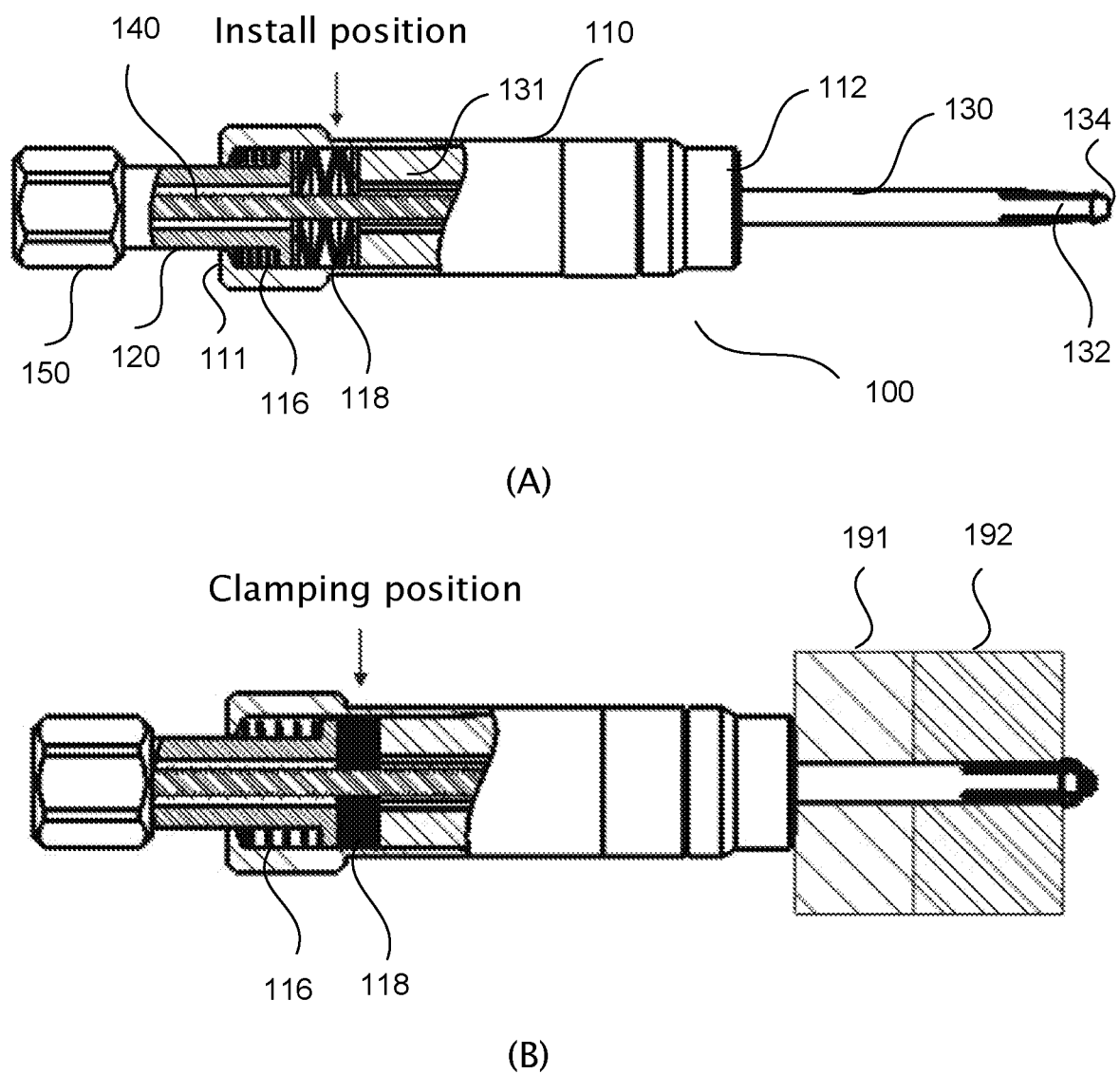
FIG. 1 illustrates a single side temporary fastener (SSTF) in an install position and clamping position, in accordance with embodiments of the present disclosure.

FIG. 1 illustrates a single side temporary fastener (SSTF) in an install position (FIG. 1A) and clamping position (FIG. 1B), in accordance with embodiments of the present disclosure. The SSTF 100 comprises a fastener housing 110 and a rotationally constrained but freely translatable collet body 130 partially disposed within the fastener housing. The fastener housing 110 encompasses the collet body 130 and a threaded screw 140 rotationally engaging with the collet body, which is rotationally constrained but is free to axially translate within the fastener housing 110. The threaded screw 140 may couple to a drive nut 150 such that when the drive nut is rotated by a user, the threaded screw 140 is also rotate concurrently. Constant clamping pressures are made possible in such embodiments by the inclusion of at least one biasing element between compression force transmitting elements and/or assemblies of the fasteners.

The collet body 130 includes a plurality of fingers 132 that terminate at one end 134. Each finger, best shown in FIG. 3, comprises a protruding portion incorporating a leading face 137 and trailing face 138. Collet body 130 further includes an internal wall portion 131 disposed within the fastener housing. The internal wall portion 131 has internal threads complementary to threaded screw 140, thereby permitting threadable engagement there between and transferring the rotational movement of the threaded screw 140 into a translational movement of collet body 130 within fastener housing 110 and also translatable threaded screw movement either towards or away from the collet body fingers.

In some embodiments, the collet body 130 includes an anti-rotation means (not shown in FIG. 1), which is preferably characterized as (a) non-circular feature(s) (e.g., a planar surface, a slot or groove, a land, a key or protrusion, etc.) for the exterior of the internal wall portion 131 to prohibit rotational movement of the collet body 130 within fastener housing 110. The fastener housing 110 has a first end 111 and a second end functioned as a work piece contacting surface 112 with a bore to allow the translational movement of the collet body. Preferably, the bore is circular, although the cross sectional profile of the bore itself may be different and generally consistent throughout its axial run.

After the collet body insertion into a work piece stack (including at least work pieces 191 and 192) defining a plurality of aligned holes, the screw rotationally interacts with the collet body by rotating the drive nut 150, and causes the latter to translatably retract into the housing until the trailing faces of the collet body fingers and the work piece contacting surface compressively hold the work pieces together in the stack. At this juncture, increasing tension-induced force is imparted in the screw, which resists reactive translation towards the collet body through its compressive coupling with the housing. As a consequence, the housing increasingly compressively contacts proximal work piece in the stack as the screw is further rotated until desired clamping has been achieved. These elements are then considered compression force transmitting elements/assemblies in that they are necessary for the establishment of a clamping action on the stack.

Figure 2:
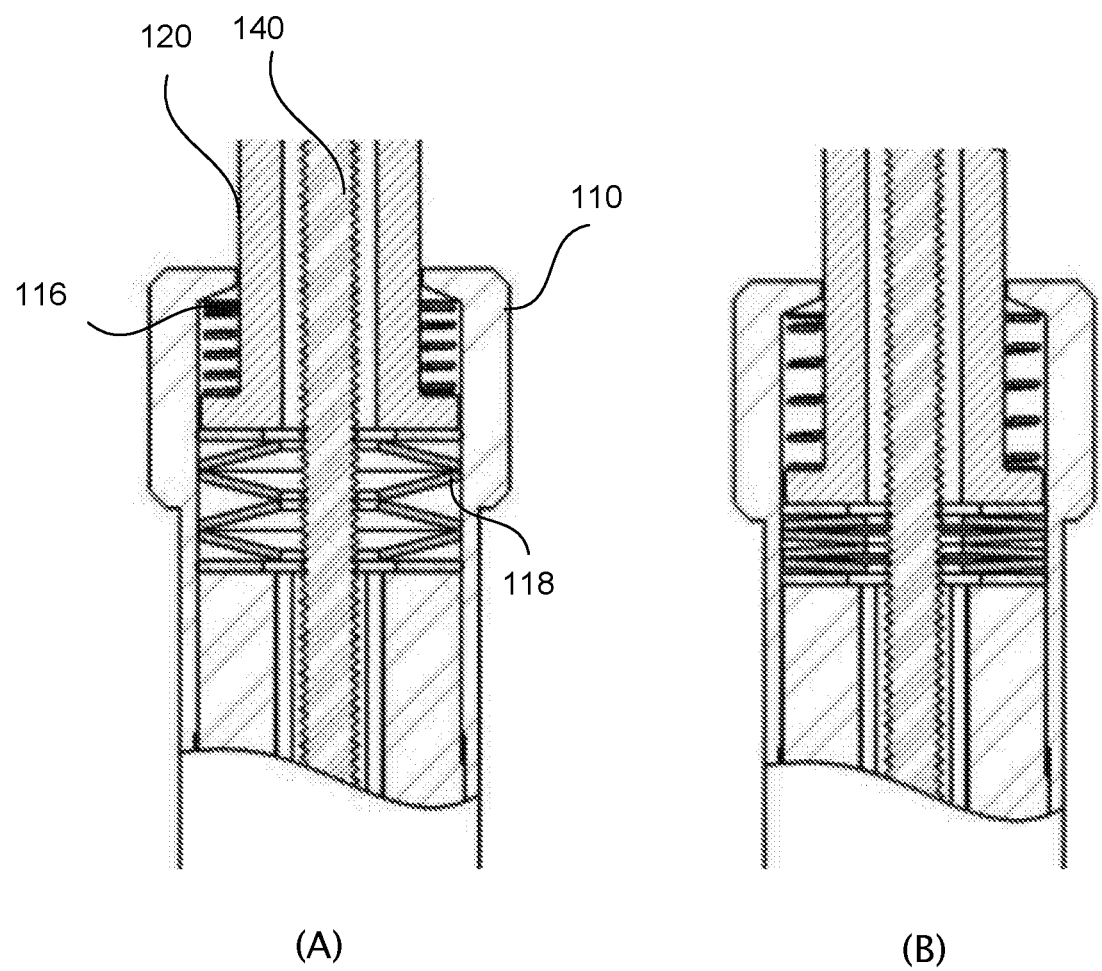
FIG. 2 illustrates a cross-section view of internal springs of the SSFT in the install position and clamping position, in accordance with embodiments of the present disclosure.

FIG. 2 illustrates a cross-section view of internal springs of the SSFT in the install position (FIG. 2A) and clamping position (FIG. 2B), in accordance with embodiments of the present disclosure. The fastener housing 110 encompasses a first internal spring 116 and a second internal spring 118. The first internal spring 116 couples between the first end 111 of the fastener housing 110 and a threaded screw wall 120 disposed partially within the fastener housing. The second internal spring 118 couples between the internal wall portion 131 of the collet body 130 and the threaded screw wall 120. When the drive nut 150 is rotated to translatably retract the collet body 130 and move the threaded screw towards the collet body fingers 132, the internal wall portion 131 of the collet body 130 is retracted to compress the second internal spring 118 in one spring end as shown in FIG. 2B. The threaded screw wall 120 translatably moves to compress the second internal spring 118 from the opposite spring end and also stretch the first internal spring 116 (or allow stretching of the first internal spring 116). While when the SSFT in the install position (FIG. 2A), the first internal spring 116 is in a compressed state and the second internal spring 118 is in a stretched state.

Figure 3:
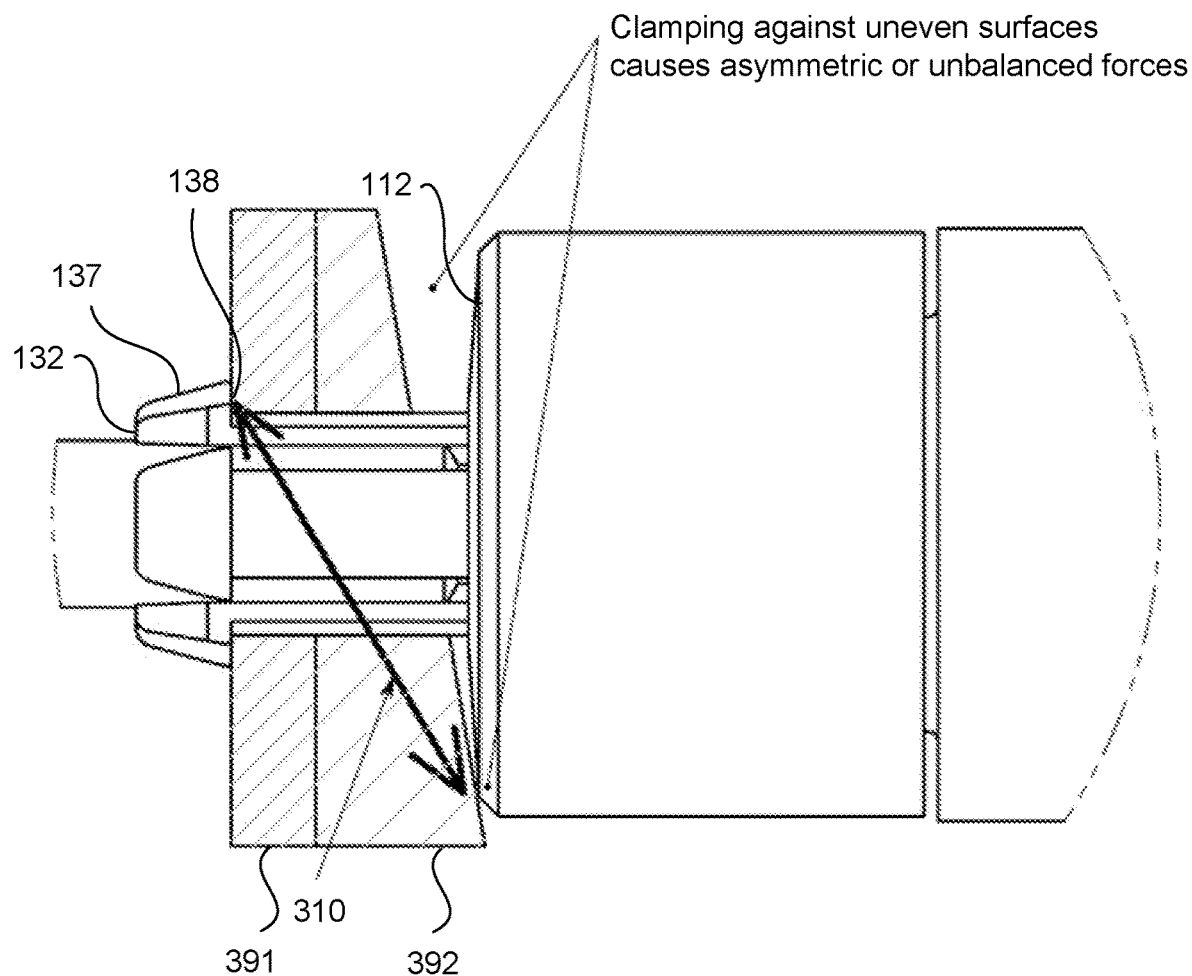
FIG. 3 illustrates a cross-section view of an SSFT to clamp unparalleled workpieces, in accordance with embodiments of the present disclosure.

FIG. 3 illustrates a cross-section view of an SSFT to clamp unparalleled workpieces, in accordance with embodiments of the present disclosure. When clamping work pieces 391 and 392 with uneven surfaces, the work piece contacting surface 112 and the work piece 392 are not fully contacting. Asymmetric loading creates a racking component to the fastener and the work pieces, as shown in reference number 310. This is almost never desirable as the racking component produces uneven loading and high stress concentrations. As a consequence, the fastener clamps against the uneven surfaces with asymmetric or unbalanced forces, which may result undesired work piece damage at the clamp spot with the highest clamping force.

Figure 4:
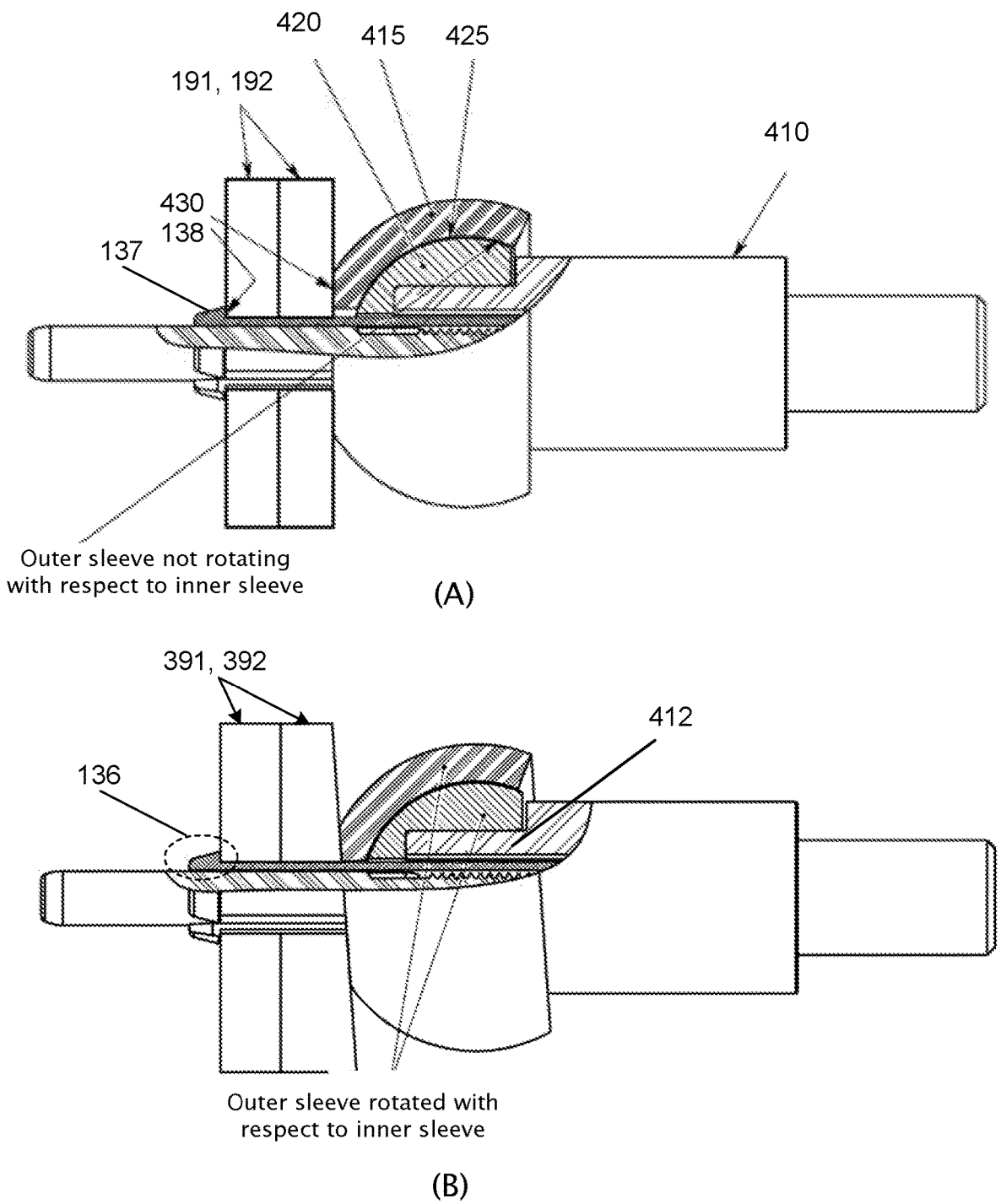
FIG. 4 illustrates a cross-section view of an SSFT incorporating sleeves to clamp parallel or unparalleled workpieces, in accordance with one embodiment of the present disclosure.

FIG. 4 illustrates a cross-section view of an SSFT incorporating sleeves to clamp parallel workpieces (FIG. 4A) and unparalleled workpieces (FIG. 4B), in accordance with one embodiment of the present disclosure. The SSFT 410 incorporates an inner sleeve 420 embracing the SSFT end 410 for collet body extending/extraction and an outer sleeve 415 with an outer sleeve contacting surface 430 as a clamping face. The outer sleeve 415 encompasses the inner sleeve 420 around a cooperating face 425, which allows differential movement of the outer sleeve with respect to the inner sleeve and allows the clamping face to align against complex surfaces or to compensate for holes that are not fabricated perpendicular to work piece surfaces. Both the outer sleeve and the inner sleeve 420 have openings to allow extending or retracting translational movement of the collet body. In some embodiments, the outer sleeve is manufactured from a material with memory characteristics and sized so that the fastener side opening is slightly smaller than the largest geometric section of the inner sleeve (inner sleeve having cooperating geometry in front of and behind largest section). The outer sleeve may be installed over the inner sleeve by forcefully inserting the outer sleeve to cause the outer sleeve to expand over the largest section of the inner sleeve and then further inserting the outer sleeve over the inner sleeve so that the fastener side opening of the outer sleeve will return to its original shape (shrinking smaller than the inner sleeve's max section) thus keeping it in the desired position. Other embodiments for retaining the outer sleeve with respect to the inner sleeve can include, but are not limited to, retaining rings, crimping means for plastically deforming the outer sleeve after insertion over the inner sleeve, threaded outer piece having a reduced section that threads over the outer sleeve from the fastener side to create the retention feature, or any other feature that creates a restriction from being removed after insertion.

As shown in FIG. 4B, when clamping uneven surface, the outer sleeve 415 is capable of accommodating changes in geometry of the work pieces by sheer or relative rotational movement with respect to the inner sleeve forced by the impetus of the clamping pressure during the early stages or process of fastening.

Figure 5:
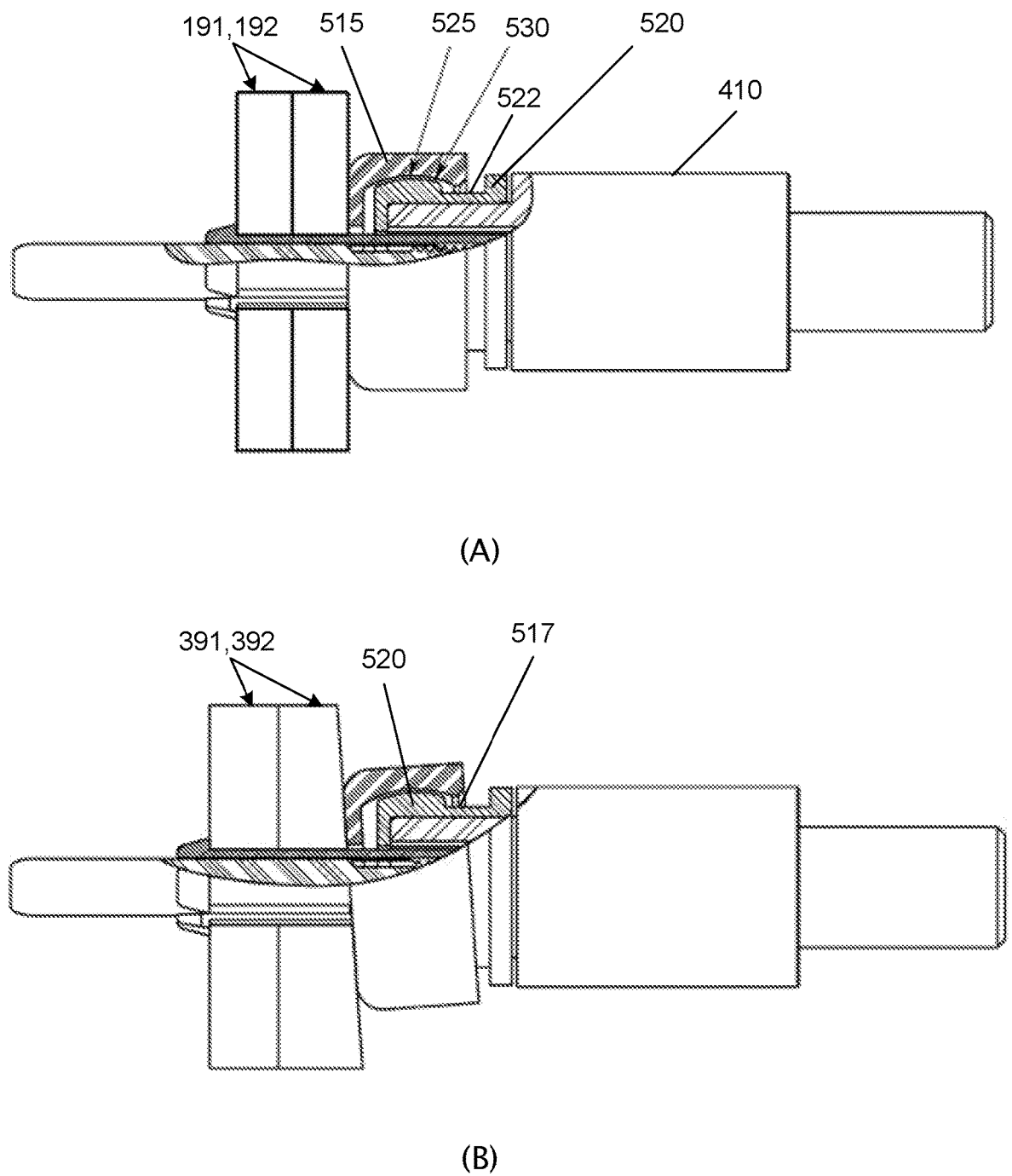
FIG. 5 illustrates a cross-section view of an SSFT incorporating sleeves with partial cooperating faces to clamp parallel or unparalleled workpieces, in accordance with another embodiment of the present disclosure.

FIG. 5 illustrates a cross-section view of an SSFT incorporating sleeves with partial cooperating faces to clamp parallel workpieces (FIG. 5A) and unparalleled workpieces (FIG. 5B), in accordance with another embodiment of the present disclosure. Instead of a full cooperating face 425 shown in FIG. 4, the cooperating face 525 in FIG. 5 between the an inner sleeve 520 and an outer sleeve 515 is a partial cooperating face (reduced contact area) with the outer sleeve and the inner sleeve partially contacting with each other. The partial cooperating face is generally parallel or aligned to the translational movement direction of the collet body. In some embodiments, there is a gap 530 between the inner sleeve 520 and an outer sleeve 515. The outer sleeve 515 has a retention end 517 to hold the outer sleeve and the inner sleeve together. The retention end 517 may slide along a sliding dent or zone 522 on the inner sleeve. The geometry of outer and inner sleeve is constructed so that retaining end 517 can slide along the sliding zone 522. When clamping uneven surface as shown in FIG. 5B, the outer sleeve 510 is capable of accommodating changes in geometry of the work pieces by a combination of both relative tilt and sliding movement with respect to the inner sleeve. Such a combination enables enhanced differential movement between the inner sleeve 520 and an outer sleeve 515, and allows reduced fastener size.

Figure 6:
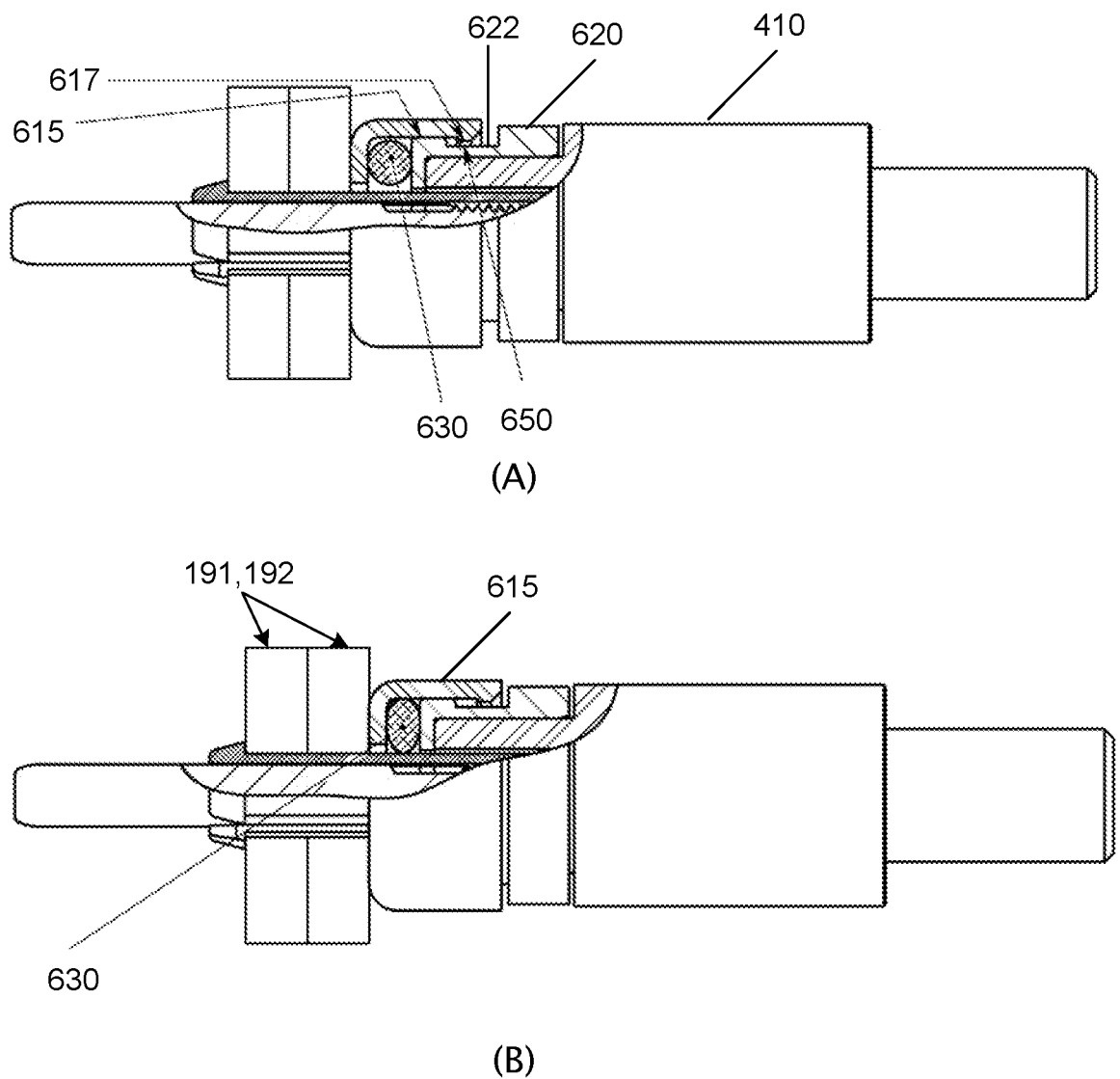
FIG. 6 illustrates a cross-section view of an SSFT incorporating sleeves and memory rings to clamp parallel before fastening and during fastening, in accordance with another embodiment of the present disclosure.

FIG. 6 illustrates a cross-section view of an SSFT incorporating sleeves and a memory ring 630 to clamp parallel workpieces before fastening (FIG. 6A) and during fastening (FIG. 6B), in accordance with another embodiment of the present disclosure. The memory ring 630 is disposed between an inner sleeve 620 and an outer sleeve 615. The memory ring can be sized to deform a maximal amount, or it can be designed to fill a void completely when compressed to as to prevent further compression and/or create a seal. Memory rings can take on many forms, such as springs, grommets, split washers, locking washers, etc. Similarly, the outer sleeve 615 has a retention end 617 to prevent the outer sleeve disengaged from the inner sleeve. The retention end 617 may slide along a sliding dent or zone 622 on the inner sleeve. The geometry of outer and inner sleeve is constructed so that retaining end 617 can slide along the sliding zone 622, thus allowing the memory ring to compress and expand unimpeded by either of the two sleeves.

The compression of the memory ring during clamping of the fastener acts as a dampener. The clamping force applied during tightening is distributed more evenly over a longer period of time thus eliminating shock loading. This is particularly usefully when installation tools (tools that install and uninstall the fastener) operate at high rates of rotational speed. In some cases, such as air powered installation tools, the high speed of rotation within the tool creates rotational inertia which can add unwanted energy to the fastener, resulting in higher than desired clamp loads. In this case, the memory ring acts as an energy dissipater, bleeding off the excessive rotational energy in the tool (the extra time and energy required to compress the ring allows the air motor to drop some of its rotational inertia (or speed) and return to a desired and more pure operating torque). This translates to a desired and consistent torque and consequently a consistent and desired clamping force being applied by the fastener.

Once compressed, the memory 630 ring acts as a spring to provide clamping force should the geometry of the work pieces change. For example, if there is a thin shim placed between the work pieces, and the shim is removed after the fastener has been installed. The removal of the shim will decrease the distance between the clamping faces of the tool. Normally, this would result in a loss of clamping force as metal components in the fastener would normally be considered rigid, and would not conform to the reduced distance. However, the compressed ring would expand slightly to compensate the thickness decrease due to the removed shim, and provide clamping force proportional to the new compressed thickness of the ring.

Figure 7:
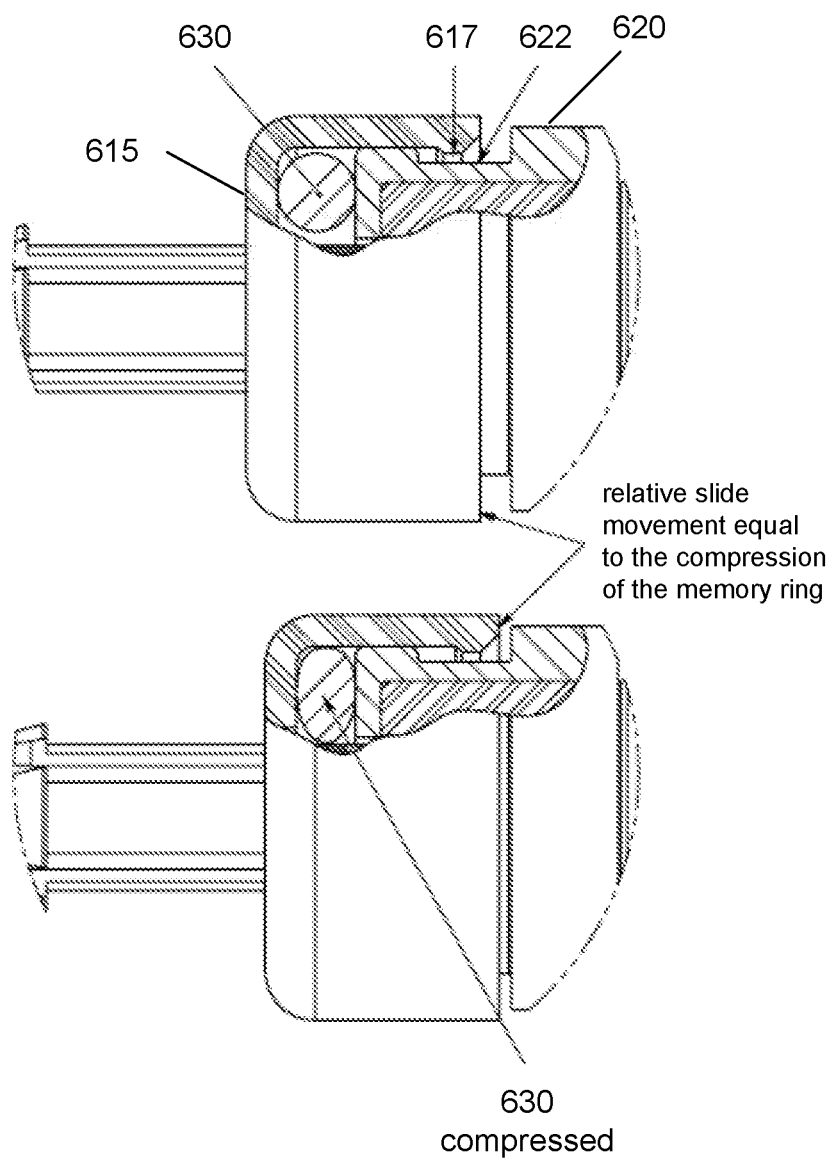
FIG. 7 illustrates a focused cross-section view of the SSFT incorporating sleeves and memory rings to clamp parallel workpieces, in accordance with another embodiment of the present disclosure.

FIG. 7 illustrates a focused cross-section view of the SSFT incorporating sleeves and a memory ring to clamp parallel workpieces, in accordance with another embodiment of the present disclosure. When the memory ring 630 is compressed during fastening, the retention end 617 of the outer sleeve 615 slides along a sliding zone 622 on the inner sleeve 620 with the relative slide motion displacement equal to the compression of the memory ring 630. Preferably, the outer sleeve 615 is pliable and deformable.

Figure 8:
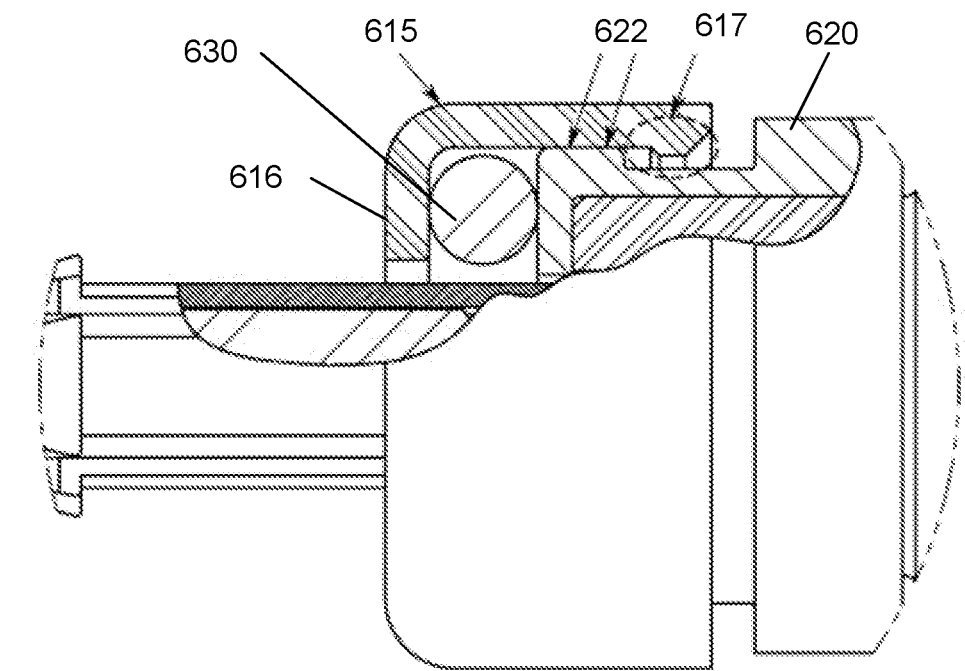
FIG. 8 illustrates a focused cross-section view of the SSFT incorporating sleeves and memory rings to clamp unparalleled workpieces before fastening and during fastening, in accordance with another embodiment of the present disclosure.
Figure 8:
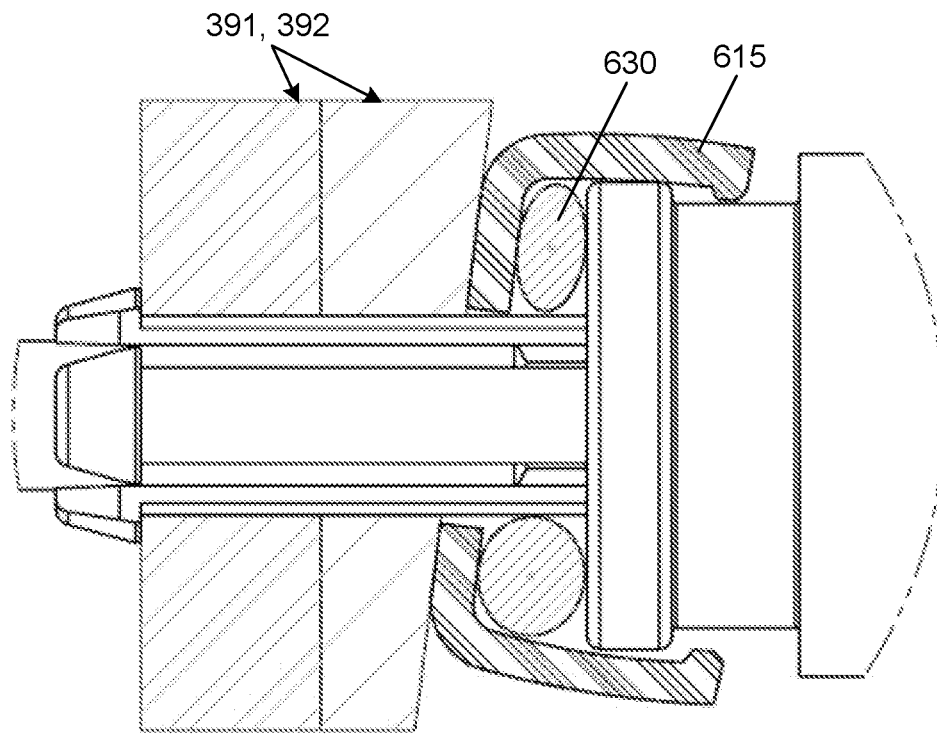

FIG. 8 illustrates a focused cross-section view of the SSFT incorporating sleeves and memory rings to clamp unparalleled workpieces before fastening (FIG. 8A) and during fastening (FIG. 8B), in accordance with another embodiment of the present disclosure. Inner diameter of outer sleeve 615 is slightly smaller than retention feature on inner sleeve 620. The Outer sleeve expands over retention feature but tends to return to its original diameter, thus creating a gripping effect on the inner sleeve. Typically, this gripping affect is only strong enough to prevent the outer sleeve's easy removal from fastener. The outer sleeve translates at the impetus of the memory ring and/or clamping force. In addition, the pliable material of the outer sleeve will deform (with memory) to align itself with an angled surface (or other complex shapes) of a part to be clamped as shown in FIG. 8B, then return to its original position at the impetus of the memory ring (returning to its pre-clamped shape). The memory ring 630 is under non-uniform compression during the fastening process when the SSTF claims unparalleled workpieces 391 and 392 together.

Figure 9:
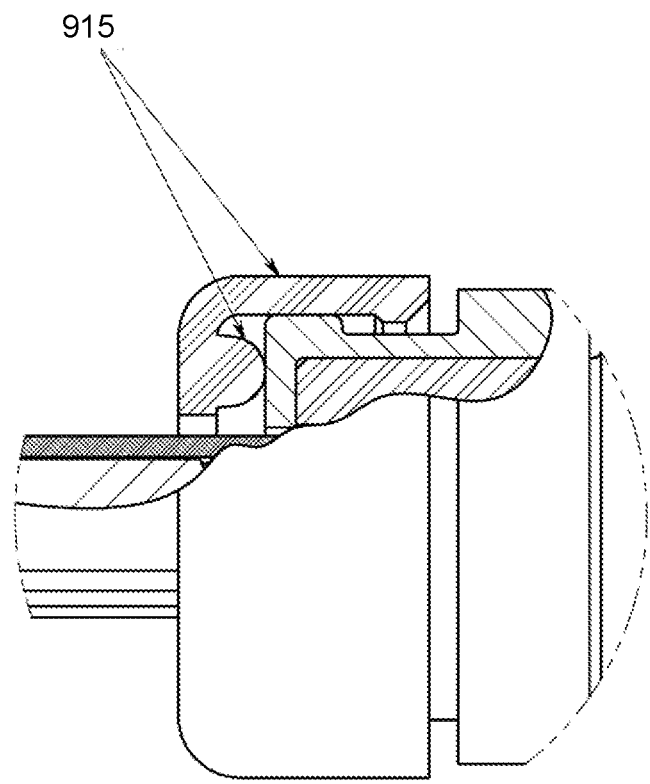
FIG. 9 illustrates a cross-section view of an SSFT incorporating a combination of an outer sleeve and a memory ring to clamp parallel or unparalleled workpieces, in accordance with another embodiment of the present disclosure.

FIG. 9 illustrates a cross-section view of an SSFT incorporating a combination of an outer sleeve and a memory ring to clamp parallel or unparalleled workpieces, in accordance with another embodiment of the present disclosure. The outer sleeve 915 inherently integrates a memory ring to provide the same combined function of the outer sleeve 615 and the memory ring 630 as shown in FIG. 8.

Figure 10:
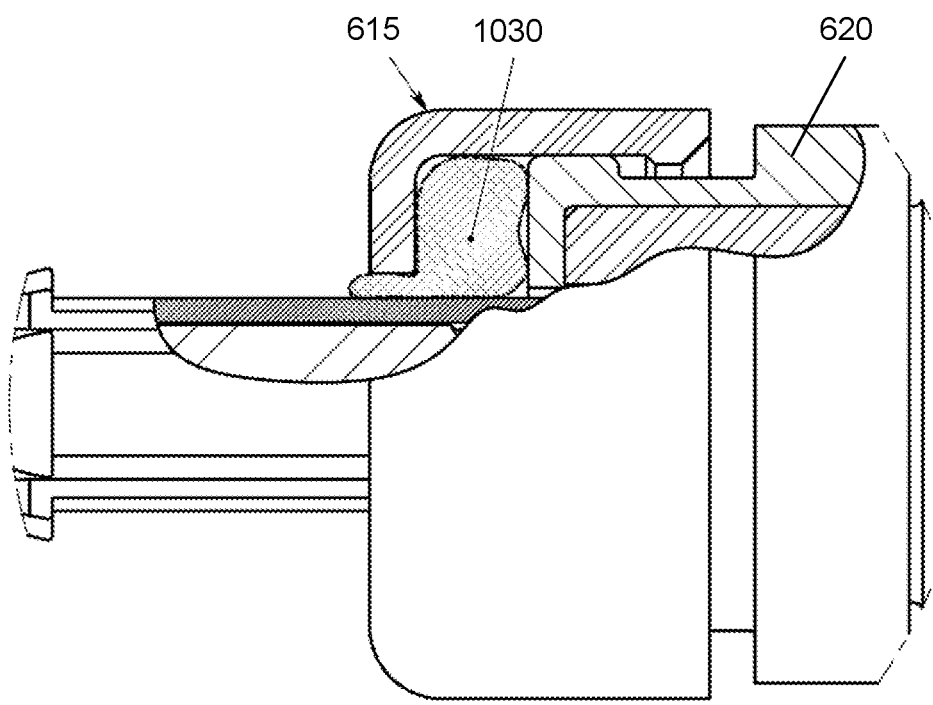
FIG. 10 illustrates a cross-section view of an SSFT incorporating a combination of an outer sleeve and a self-adjusting seal clamping parallel or unparalleled workpieces, in accordance with another embodiment of the present disclosure.

FIG. 10 illustrates a cross-section view of an SSFT incorporating a combination of an outer sleeve and a self-adjusting seal clamping parallel or unparalleled workpieces, in accordance with another embodiment of the present disclosure. Compared to FIG. 8, the memory ring is replaced by a self-adjusting seal 1030 in FIG. 10. During the fastening process, the self-adjusting seal 1030 is compressed accordingly to comply with work piece situation.

Figure 11:
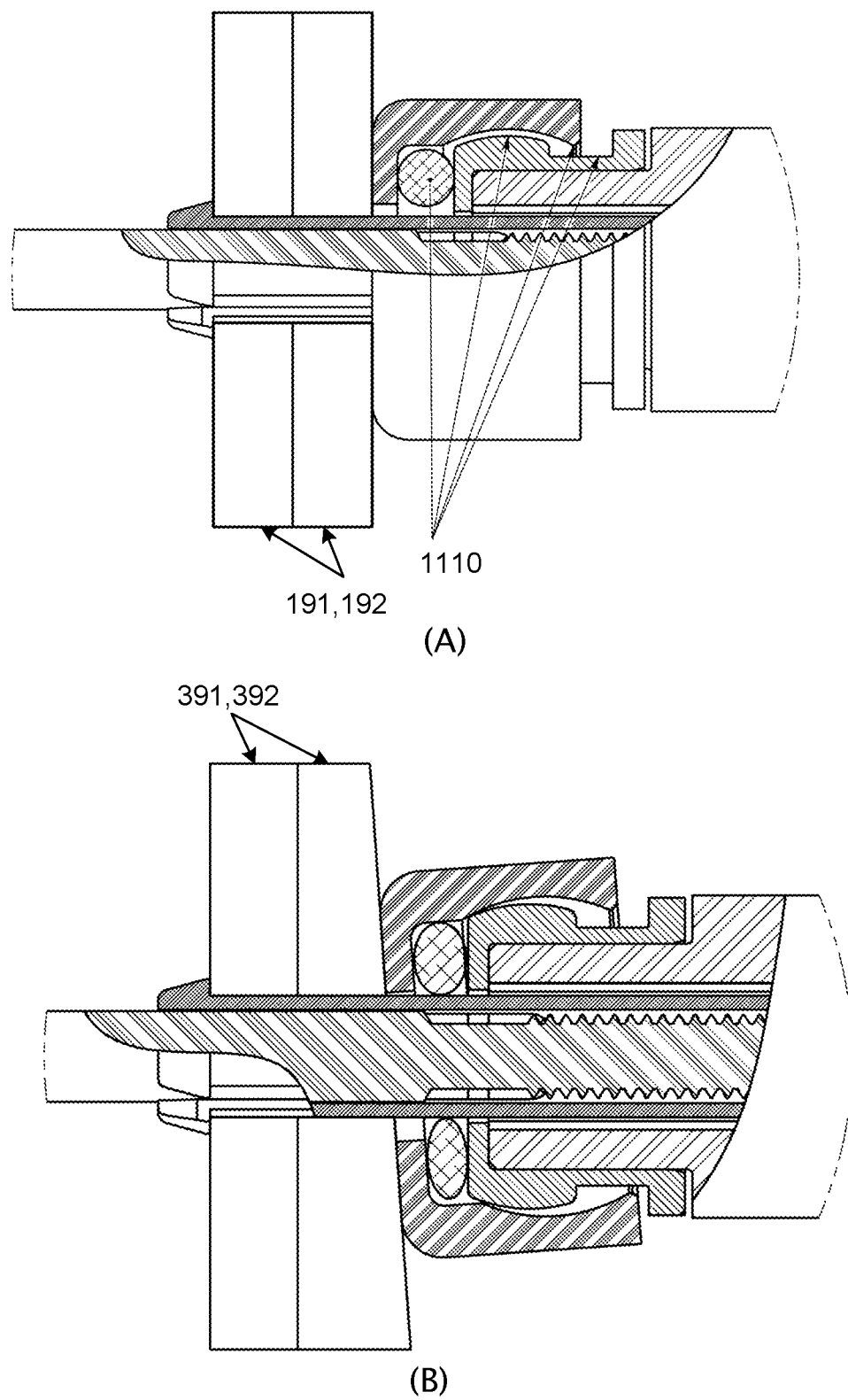
FIG. 11 illustrates a cross-section view of an SSFT incorporating a combination of retention features, free slide zone, cooperating faces, and memory ring to clamp parallel or unparalleled workpieces, in accordance with another embodiment of the present disclosure.

FIG. 11 illustrates a cross-section view of an SSFT incorporating a combination of retention features, free slide zone, cooperating faces, and memory ring to clamp parallel or unparalleled workpieces, in accordance with another embodiment of the present disclosure. The SSTF incorporates a hybrid sleeve structure 1110 combining the aforementioned retention end, free slide zone, cooperating faces, and memory ring to facilitate a robust and efficient solution for clamping parallel workpieces 191, 192 as shown in FIG. 11A or unparalleled workpieces as shown in FIG. 11A. The combination creates an outer sleeve which can translate (to dampen and create spring affect), rotate (to align), create a seal if desired, and to do so simultaneously.

Those skilled in the art will realize that the single side temporary fastener (SSTF) can be constructed with various configuration. For example a SSTF may comprise different combination of components other than disclosed in the aforementioned embodiments. Those skilled in the art will also realize that a SSTF may further incorporate different components. The foregoing description of the invention has been described for purposes of clarity and understanding. Various modifications may be implemented within the scope and equivalence of the appended claims.

The invention claimed is:

1. A temporary fastener to fasten at least two work pieces together, where a portion of the temporary fastener is disposed in substantially aligned holes or bores formed in the at least two work pieces, comprising:
    a fastener housing having a first end and a second end, wherein the second end has a bore to allow extending or retracting translational movement of a collet body within the fastener housing;
    a threaded screw coupled to a threaded section of the collet body and including a distal end that extends between a plurality of radially displaceable fingers of the collet body when the temporary fastener is in a clamped configuration;
    an inner sleeve embracing the second end;
    an outer sleeve encompassing the inner sleeve and retained to the inner sleeve with a cooperating face between the outer sleeve and the inner sleeve; and
    a memory ring disposed between the inner sleeve and the outer sleeve;
    wherein the outer sleeve includes an exterior work piece contacting surface and an interior surface on opposing sides thereof and wherein the interior surface contacts the memory ring;
    wherein the outer sleeve has relative rotational movement with respect to the inner sleeve around the cooperating face induced by clamping pressure when the at least two work pieces are fastened; and
    wherein the exterior work piece contacting surface functions as a clamping face of at least one of the at least two work pieces.

2. The temporary fastener of claim 1, wherein the outer sleeve is manufactured from a pliable and deformable material with memory characteristics.

3. The temporary fastener of claim 1, wherein the cooperating face is a partial cooperating face with the outer sleeve and the inner sleeve partially contacting each other.

4. The temporary fastener of claim 3, wherein there is a gap between the inner sleeve and the outer sleeve.

5. The temporary fastener of claim 3, wherein the partial cooperating face is aligned to the translational movement of the collet body.

6. The temporary fastener of claim 1, wherein the outer sleeve has a retention end to retain the outer sleeve to a sliding zone on the inner sleeve and wherein the sliding zone allows the retention end to slide along the sliding zone.

7. The temporary fastener of claim 1, wherein the collet body and the housing each include a corresponding non-circular anti-rotation section configured to prohibit rotational movement of the collet body in the housing during rotation of the threaded screw.

8. The temporary fastener of claim 1, wherein the memory ring is a grommet.

9. The temporary fastener of claim 1, wherein the memory ring is integrated into the outer sleeve.

10. The temporary fastener of claim 1, wherein the memory ring comprises a self-adjusting seal disposed between the inner sleeve and the outer sleeve.

11. The temporary fastener of claim 1, further comprising a drive nut coupled to the threaded screw for concurrent rotation.

12. The temporary fastener of claim 11, wherein the fastener housing encompasses a first internal spring and a second internal spring, the first internal spring coupling between the first end of the fastener housing and a threaded screw wall disposed partially within the fastener housing, and the second internal spring coupling between an internal wall portion of the collet body and the threaded screw wall.

13. The temporary fastener of claim 12, wherein the drive nut is rotated to translatably retract the collet body, and the second internal spring is compressed between the internal wall portion of the collet body and the threaded screw wall.

14. The temporary fastener of claim 12, wherein the drive nut is rotated to translatably retract the collet body, and the first internal spring is stretched between the first end of the fastener housing and the threaded screw wall.

15. The temporary fastener of claim 1, wherein the cooperating face is a partial cooperating face aligned to the translational movement of the collet body.

* * * * *